(12) United States Patent
Cohn et al.

(10) Patent No.: US 7,543,530 B2
(45) Date of Patent: Jun. 9, 2009

(54) BARRIER SUBMERSION COOKING POUCH AND BASKET

(76) Inventors: Robert Cohn, 61 Sterling Ave., Dallas, PA (US) 18612; J. Mark Suchecki, 1820 Valley Forge Rd., Allentown, PA (US) 18104

( * ) Notice: Subject to any disclaimer, the term of this patent is extended or adjusted under 35 U.S.C. 154(b) by 0 days.

(21) Appl. No.: 11/830,957

(22) Filed: Jul. 31, 2007

(65) Prior Publication Data
US 2008/0220134 A1 Sep. 11, 2008

Related U.S. Application Data

(63) Continuation-in-part of application No. 10/709,273, filed on Apr. 26, 2004.

(60) Provisional application No. 60/821,062, filed on Aug. 1, 2006, provisional application No. 60/884,897, filed on Jan. 15, 2007.

(51) Int. Cl.
A47J 27/10 (2006.01)
A47J 37/12 (2006.01)
B65D 33/14 (2006.01)
B65D 81/34 (2006.01)

(52) U.S. Cl. .............................. 99/426; 99/403; 99/410; 99/414

(58) Field of Classification Search .................. None
See application file for complete search history.

(56) References Cited

U.S. PATENT DOCUMENTS

| 2,204,699 | A |   | 6/1940  | Robertson |   |
|-----------|---|---|---------|-----------|---|
| 2,323,623 | A |   | 7/1943  | Porter et al. | |
| 2,659,362 | A |   | 11/1953 | Strehl    |   |
| 2,912,336 | A | * | 11/1959 | Perino ........................ 426/107 |
| 3,531,300 | A | * | 9/1970  | Greenberg et al. .......... 426/232 |
| 3,532,225 | A | * | 10/1970 | Reed ........................ 211/181.1 |
| 3,578,239 | A |   | 5/1971  | Perman    |   |
| 3,607,312 | A |   | 9/1971  | Ready     |   |
| 3,658,562 | A | * | 4/1972  | Wilson ....................... 426/395 |
| 3,716,369 | A | * | 2/1973  | Perlman ..................... 426/403 |

(Continued)

FOREIGN PATENT DOCUMENTS

WO 2008016918 A2 2/2008

OTHER PUBLICATIONS

International Search Report of PCT/US07/74848 mailed Jan. 29, 2008.

*Primary Examiner*—Joseph M Pelham (57) ABSTRACT

A system and method for barrier submersion cooking comprising a thin walled plastic cooking pouch for receiving a food item effectively dimensioned such that when placed into a hot liquid cooking medium a vent remains above a top surface of the liquid cooking medium and a rack for lowering the vessel into the liquid cooking medium to an effective depth such that the food item received by the pouch is below the top surface of the liquid cooking medium and the vent is above the top surface of the liquid cooking medium. The pouch is formed of food grade pliable polymer film having a melt temperature above that of a temperature used in conventional hot oil frying processes, a heat transfer rate of an effective value to substantially instantaneously transfer heat from the liquid cooking medium to create an effective frying temperature upon the food item, and a pliability such that the pouch will collapse on itself when exposed to hydrostatic pressures when submerged within the liquid cooking medium, thereby effectively transferring heat to all food item surfaces.

6 Claims, 6 Drawing Sheets

U.S. PATENT DOCUMENTS

| | | | |
|---|---|---|---|
| 3,819,089 A * | 6/1974 | Scales | 222/95 |
| D236,414 S | 8/1975 | Kroll | |
| 3,908,534 A | 9/1975 | Martin | |
| 3,935,810 A * | 2/1976 | Milano | 99/467 |
| 3,946,654 A * | 3/1976 | Janssen | 99/403 |
| 4,215,629 A * | 8/1980 | Janssen | 99/403 |
| 4,412,482 A * | 11/1983 | Janssen | 99/403 |
| 4,445,428 A | 5/1984 | Buford | |
| 4,462,915 A | 7/1984 | Friedman | |
| 4,499,817 A * | 2/1985 | Janssen | 99/403 |
| 4,508,027 A | 4/1985 | McCord | |
| 4,873,919 A * | 10/1989 | Janssen | 99/403 |
| 5,086,924 A * | 2/1992 | Oberle | 206/497 |
| 5,359,924 A * | 11/1994 | Roberts et al. | 99/416 |
| 5,407,611 A | 4/1995 | Wilhoit et al. | |
| 5,613,423 A * | 3/1997 | Polster | 99/330 |
| D394,371 S | 5/1998 | Cousins | |
| 5,814,382 A * | 9/1998 | Yannuzzi, Jr. | 428/34.3 |
| 5,865,103 A | 2/1999 | MacGeorge et al. | |
| 5,871,790 A * | 2/1999 | Monier et al. | 426/107 |
| 5,937,743 A | 8/1999 | Overstreet | |
| 5,994,672 A | 11/1999 | Mestnik | |
| 6,048,558 A * | 4/2000 | Feldmeier et al. | 426/120 |
| 6,884,978 B2 * | 4/2005 | Monforton et al. | 219/727 |
| 7,040,219 B1 * | 5/2006 | D'Amato et al. | 99/426 |
| 2003/0021870 A1 * | 1/2003 | Pollok et al. | 426/412 |
| 2004/0115318 A1 * | 6/2004 | Janssen et al. | 426/124 |
| 2004/0252921 A1 * | 12/2004 | Winiarski et al. | 383/207 |
| 2005/0235838 A1 | 10/2005 | Cohn | |
| 2007/0134382 A1 * | 6/2007 | Schmal et al. | 426/412 |
| 2008/0199579 A1 * | 8/2008 | Carre | 426/393 |

* cited by examiner

BARRIER SUBMERSION COOKING POUCH AND BASKET

CROSS-REFERENCE TO RELATED APPLICATIONS

This application claims benefit of U.S. provisional application No. 60/821,062 filed Aug. 1, 2006 and U.S. provisional application No. 60/884,897 filed Jan. 15, 2007 and is a continuation-in-part of and claims benefit of U.S. application Ser. No. 10/709,273 filed Apr. 26, 2004, all incorporated by reference herein.

FIELD OF THE INVENTION

This invention relates generally to the preparation of food and in particular, to an improved apparatus and method for barrier submersion cooking.

BACKGROUND OF THE INVENTION

Deep fryers are one of the most useful and popular devices in the commercial kitchen. Deep fryers have been used for years to make french fries, breaded foods, and specialty pastries. Their highly efficient and uniform heat transfer rate results in fast, accurate, and economical cooking.

The modern deep fryer consists of a large well or heating chamber which is filled with cooking oil. The cooking oil is heated to between 350 degrees to 400 degrees F. by electric resistance heaters inside the well or gas fired burners located below the heating chamber. Food items to be cooked are placed in wire baskets and lowered into the hot oil to a point of total submersion. Due to the high efficiency of liquid-to-solid heat transfer as well as the high ratio of hot oil volume to cool food volume, heat is rapidly transferred from the hot oil into the cool food product. This rapid and even heat transfer tends to produce a crisp outer surface while heating the foods inner core. The crisp outer food surface acts to seal the food while the moisture on the interior of the food is rapidly increased in temperature effectively steaming the inside of the food. This results in cooked foods such as french fries, fried chicken, or donuts which are crisp on the outside and moist and hot on the inside.

The flavor and unique texture of deep fried foods are key to their popularity. Inherent in this cooking method is a tendency for the food items to absorb a percentage of the oil in which they are being cooked. The amount of oil absorbed into the food can be somewhat reduced by adjusting the oil type and temperature, however, even under the best circumstance, some oil is absorbed into the food. This absorbed oil substantially increases the fat content of the food. High fat content is undesirable in foods. As a result, fried foods are linked to obesity and other health problems.

To eliminate the oil absorption problem, various methods of air frying have been created. Air frying consists of a stream of hot air into which the food product is introduced. The heat transfer efficiency of air-to-solids is lower than the heat transfer efficiency of liquid-to-solids. In an effort to improve heat transfer, a thin coat of oil is typically added to the surface of the food before heating. The oil acts as a heat transfer medium more efficiently coupling the hot air to the cooler food product.

The hot dry air which is used to satisfactorily heat the food causes moisture to evaporate from the food product. Air fried foods typically have a dry outer surface which is less crisp than deep fried foods. Moisture also tends to evaporate from the core of the food as the surface is heated. As a result, due to its poor texture and less desirable taste, air fried foods have not found the level of acceptance typical of deep fried food. New food products have been developed in an effort to overcome the deficiencies of air frying but none has equaled the acceptance of deep fried foods.

In an effort to gain the advantages of liquid-to-solid heat transfer while avoiding the disadvantages of food absorption of the liquid, various submersion barrier cooking techniques have been developed. Submersion barrier cooking requires the food item be held in a container, the container thereafter being submerged into the heated liquid. In theory, the container is fabricated of a material whose heat transfer rate is sufficiently efficient to not appreciably degrade the transfer of heat from the heated liquid to the food. However, in practice, prior attempts at submersion barrier cooking have failed to produce a cooked food product which equals the taste and texture of that produced by traditional deep frying.

Accordingly, there remains a continuing need for improved methods to isolate a food product from the cooking liquid yet continue to maintain the flavor and texture of that produced by traditional deep frying. The present invention fulfills this need, and further provides related advantages.

BRIEF SUMMARY OF THE INVENTION

The present invention relates to an improved pouch and basket design used in barrier submersion cooking of food items using standard deep fryers. The present invention places the food item into a disposable high temperature thin film plastic cooking pouch fabricated from a material with an effective heat transfer rate that will cause the temperature of the interior vessel wall to achieve effective frying temperature substantially instantaneously after placement into hot cooking oil.

The disposable plastic cooking pouch of the present invention has important advantages over reusable cooking vessels and cooking pouches fabricated from metal. Reusable vessels are rigid and do not conform to the shape of many food items. The metal vessels have greater weight and conduct more of the heat away from the food than do the disposable pouches of the present invention. Additionally, reusable vessels must be cleaned after use.

Disposable cooking pouches fabricated from aluminum and other metal foils exhibit a tendency to leak from weakness around the seams and more notably from stress risers, which are created as the foil is manually compressed to form tightly around the contours of the food item prior to placement within the cooking oil. Also, air pockets between the food item and foil are formed due to the foil's relatively rigid nature and the food item's many contours. Foil gauge and seam design have little impact in improving the metal pouch's tendency to develop leaks. The thin walled plastic cooking pouch of the present invention which collapses upon itself when exposed to cooking oil hydrostatic pressures obviates these problems.

Loading food items into a thin walled cooking pouch can be both difficult and time consuming. The cooking pouch's thin material makes it particularly difficult to both find the pouch's top opening and to grasp and pull apart the sides of the pouch. The novel food slide of the present invention provides an improved method for easily and efficiently loading a thin walled pouch.

A typical loaded cooking pouch floats in the hot oil used in the barrier submersion cooking process. As the pouch floats, it tends to move out of the confines of known wire baskets through the basket's side loading entrance. Once freed from the confines of the wire basket, the food's buoyancy allows the pouch to rise to the surface of the cooking oil causing the cooking pouch to capsize, thereby allowing hot oil to enter the pouch through its top vent and contaminate the food item inside. The novel slant wire basket design of the present invention prevents such pouch migration.

In a preferred embodiment, a thin walled plastic pouch having an open top is effectively dimensioned to receive a food item and thereafter be placed into the hot oil of a deep fryer while maintaining a vent above the top surface of the oil. The pouch open top serves as the vent.

Using a slant wire rack, the pouch is lowered into the deep fryer's hot oil to an effective depth such that the food item is below the surface of the oil while the vent remains above the top level of the hot oil, preventing the oil from entering into the pouch and directly contacting the food item. Oil hydrostatic pressure operating against the thin wall plastic pouch causes it to collapse around and intimately contact the food item as it is immersed within the oil. Due to the high heat transfer characteristics inherent in the pouch material, heat is substantially instantaneously transferred from the hot oil through the cooking pouch to the food item contained within.

The food item, which is in intimate contact with the pouch, starts frying nearly immediately. Steam and hot vapors omitted from the food during the frying process vent through the top opening of the pouch.

Another advantage of the submersion barrier cooking process of the present invention is that the thin walled plastic cooking pouch does not have to be preheated because it is substantially instantly brought up to cooking temperature when submerged into the hot cooking oil.

Yet another advantage of the present invention is that a food item will be more evenly heated over its entire surface than that achieved by non-deep fried methods while avoiding absorption of unhealthy cooking oil inherent in traditional deep fried cooking.

Still another advantage is the cost savings achieved in the commercial environment, in that no additional special cooking equipment is required other than a restaurant's existing deep fryer and the pouch and rack of the present invention. The present invention allows a restaurant to extend its cooking capabilities without additional significant equipment purchases.

Other features and advantages of the present invention will be apparent from the following more detailed description of the preferred embodiments, taken in conjunction with the accompanying drawings which illustrate, by way of example, the principles of the invention.

DETAILED DESCRIPTION OF THE INVENTION

Figure 1:
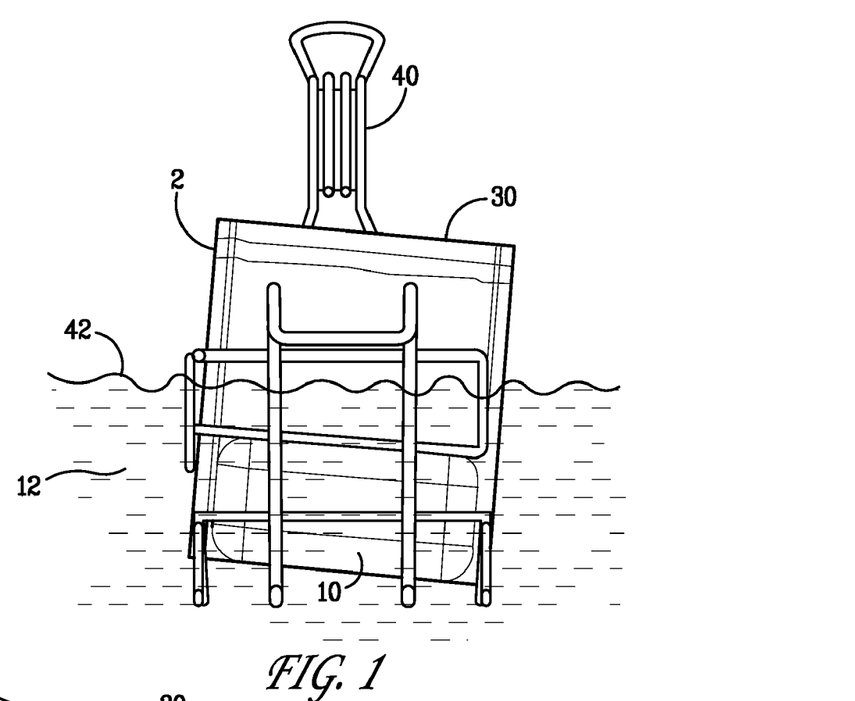
FIG. 1 is an end view of the pouch containing basket inserted into cooking oil.

Turning now to FIG. 1, thin walled plastic cooking pouch 2 is formed of food grade pliable polymer film having a melt temperature above that of temperatures used in conventional hot oil frying processes, generally about 350 degrees to about 400 degrees F.; a heat transfer rate of an effective value to substantially instantaneously transfer the heat from hot cooking oil 12 to create effective frying temperature at food item 10; and a pliability such that it will collapse on itself when exposed to oil hydrostatic pressures when submerged within the oil 12. Such food grade polymers include, for example, polyamide film such as nylon 66 and polyester film such as mylar.

Figure 2:
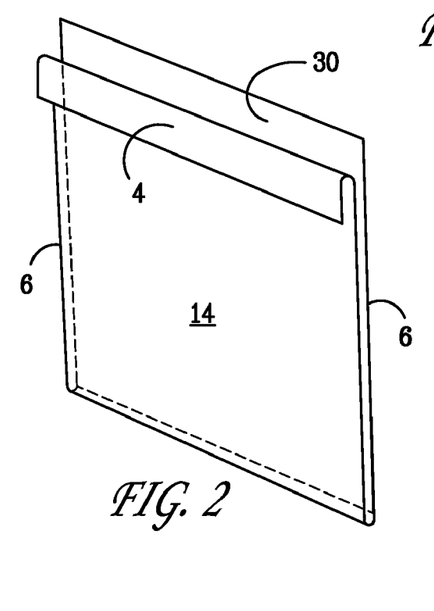
FIGS. 2 and 3 are perspective views of a first pouch form.
Figures 4, 5, 6, 7, 8, 9:
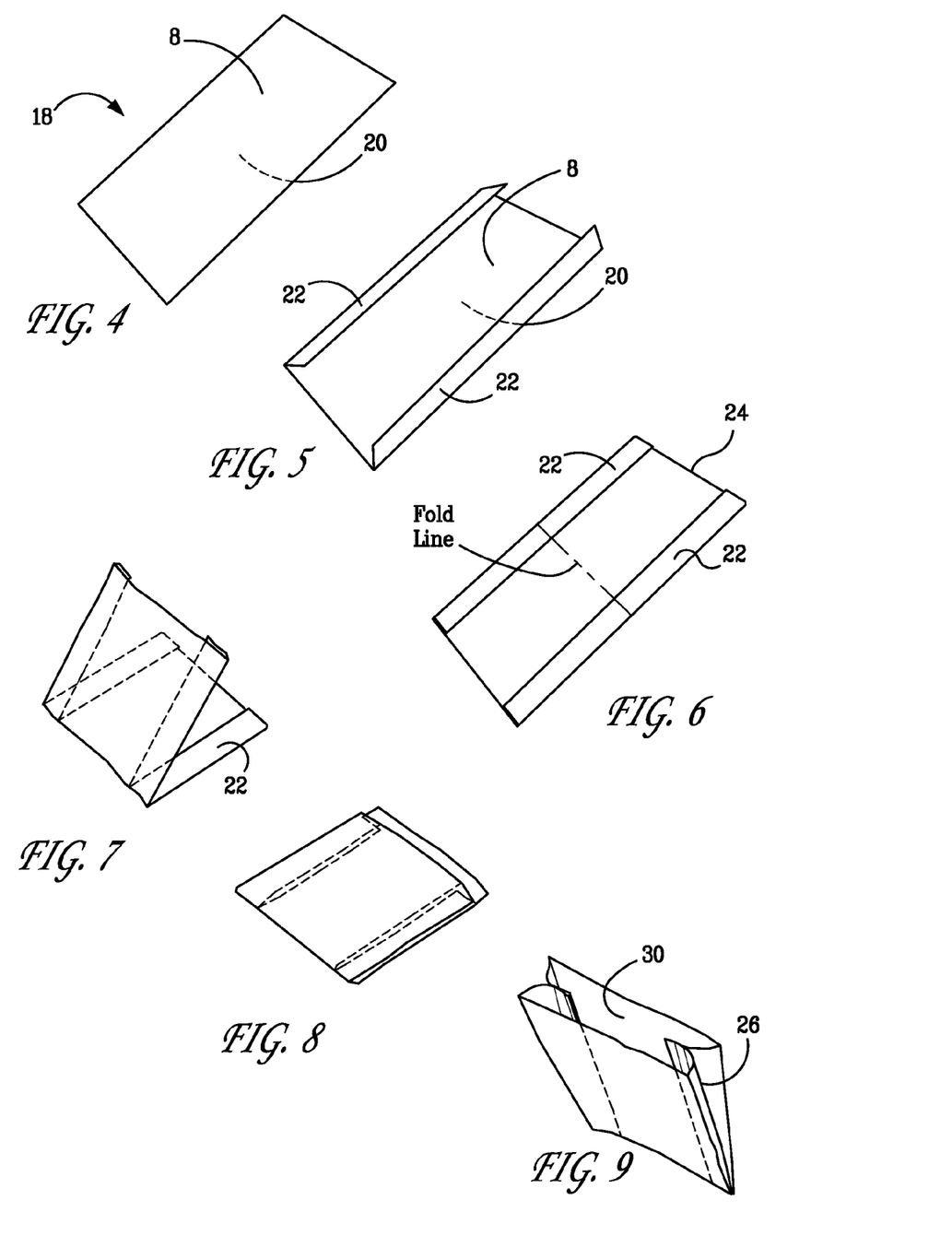
FIGS. 4 through 9 are perspective views of the formation of a second pouch form.

Pouch 2 is sealed on three sides while maintaining a patent open top 30 (FIGS. 2 and 9). Pouch open top 30 must have a patent opening so that hot steam and other vapors created by rapidly cooking food item 10 can vent while at the same time maintaining intimate contact with food item 10. Pouch open top 30 may optionally be sealed using, for example, an interrupted seal, or alternatively, a vapor permeable seal, or a pressure release seal. Such seals while permitting vapors to vent, have the additional advantage of maintaining food item 10 integrity during transit.

For purposes of this disclosure, thin walled is meant to include a pouch wall thickness such that pouch 2 will collapse around and intimately contact food item 10 contained within pouch 2 when exposed to hot cooking oil 12 hydrostatic pressures.

In a preferred embodiment, pouch 2 is formed from, for example, mylar film having a film thickness of about 0.001 inch. The pliable nature of the plastic film allows hydrostatic pressure from cooking oil 12 to press the film tightly against the convoluted surfaces of food item 10 contained within pouch 2. The close coupling of pouch 2 to the surface of food item 10 eliminates cool air pockets inside pouch 2, resulting in more evenly cooked food.

Figure 3:
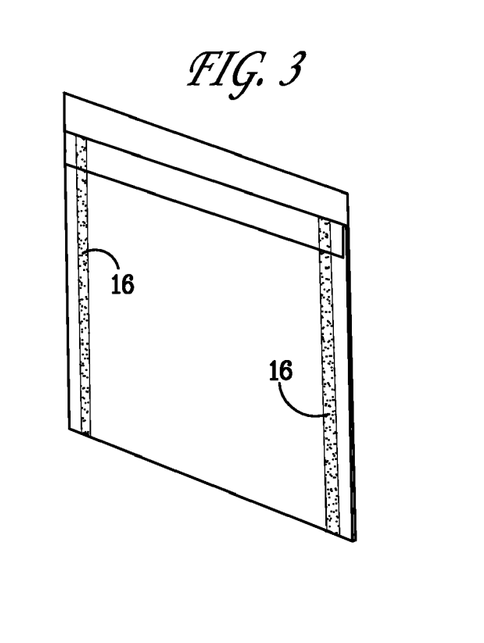

Turning to FIGS. 2 and 3, in a first pouch form, film 14 is folded on itself so as to create an opening 4, optionally, an offset, hemmed opening. Sides 6 are sealed, for example, by conventional heating or ultrasonic seaming methods, creating seam 16.

In a second pouch form, shown in FIGS. 4 through 9, conventional high temperature coated cooking film 18 is used. Such known films have an uncoated side 8 and a coated side 20 that can be heat sealed to itself at temperatures below the melting temperature of film 18. Film 18 is folded on itself and hemmed such that coated hemmed areas 22 face the inside of pouch 2. Hemmed film 24 is folded in half whereupon heat and pressure are applied to hemmed areas in conventional manner to form seal 26. Thus, film coated side 20 is maintained on the outside of pouch 2 so that the pouch insides do not adhere to each other once collapsed upon pouch 2 placement in hot oil 12.

Figure 10:
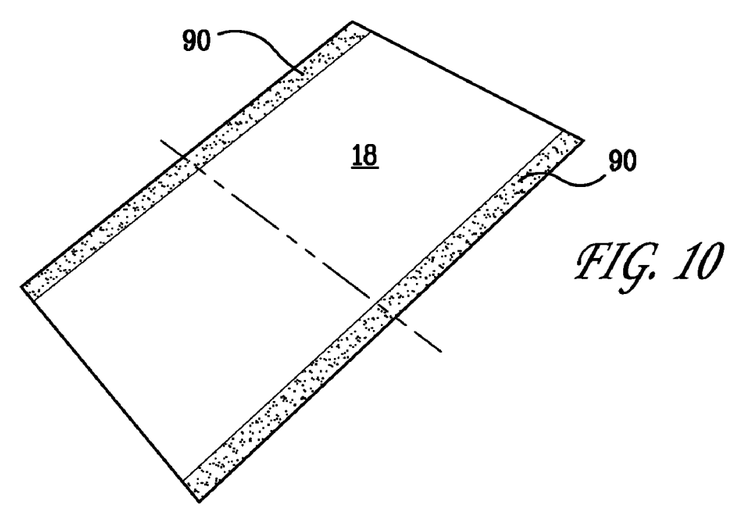
FIGS. 10 through 12 are perspective views of the formation of a third pouch form.
Figure 11:
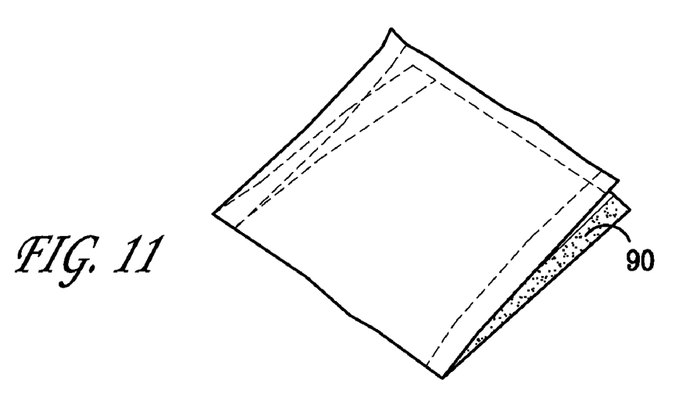
Figure 12:
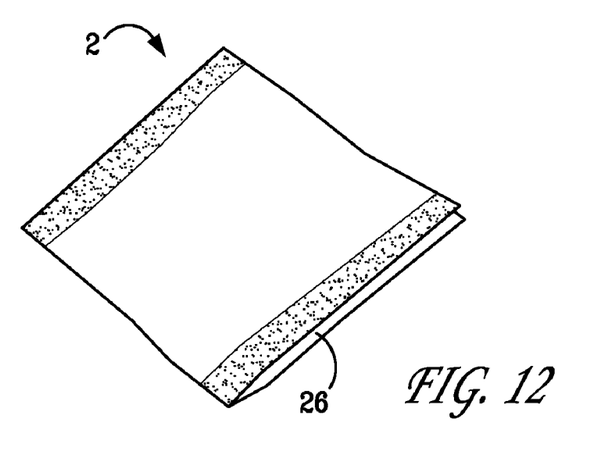

In a third pouch form, shown in FIGS. 10 through 12, a pattern coat of food grade high temperature adhesive is applied to a predetermined area of film 18, for example, the edges 90 of film 18. Film 18 is thereafter folded in half such that the edges adhere to one another, forming pouch seal 26. It should be apparent that any pattern application that results in pouch formation is contemplated by the invention.

Figure 13:
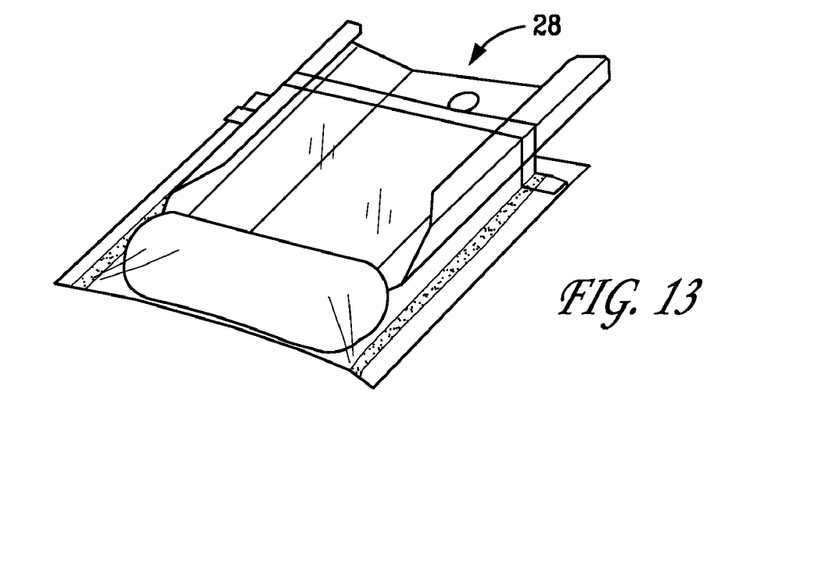
FIGS. 13 and 14 are perspective views of the food slide delivering a food item to the pouch.
Figure 14:
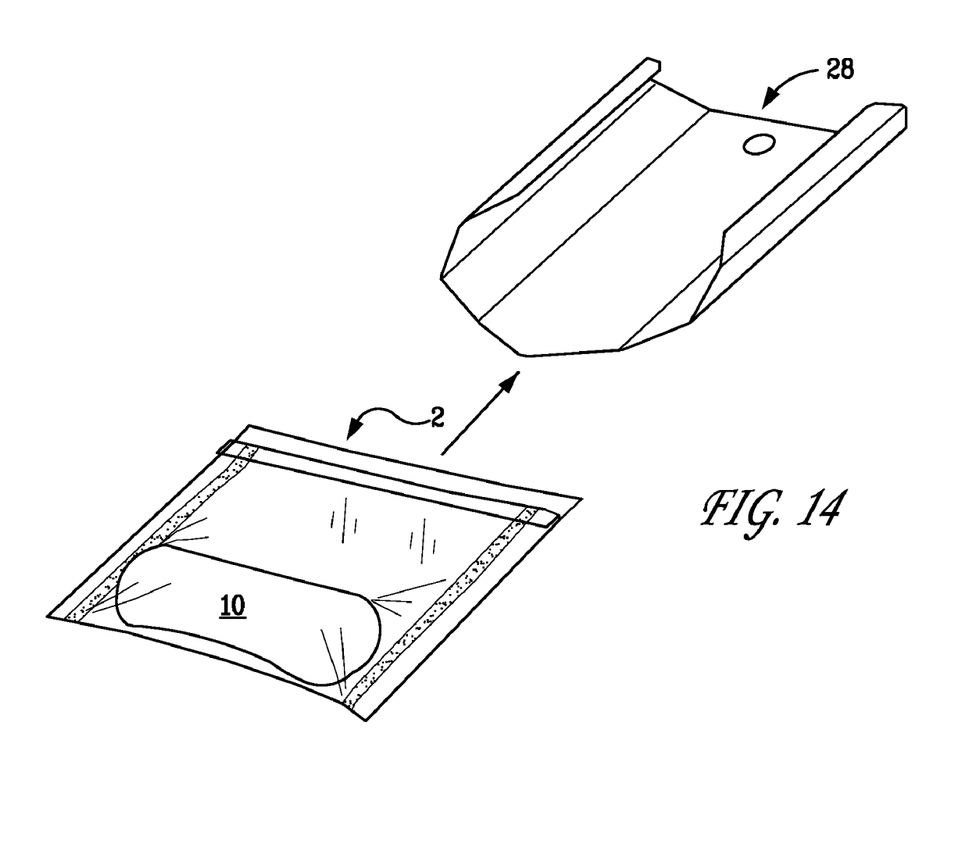
Figure 15:
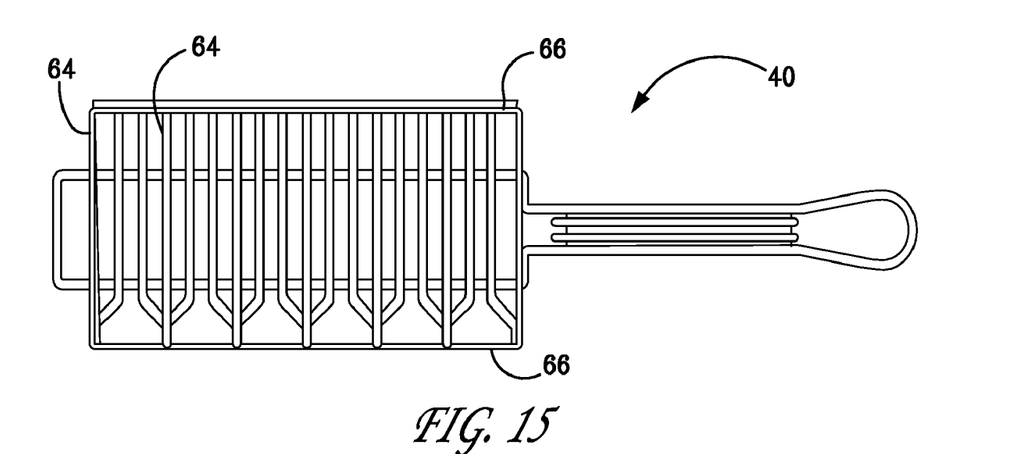
FIG. 15 is a top view of the rack.
Figure 16:
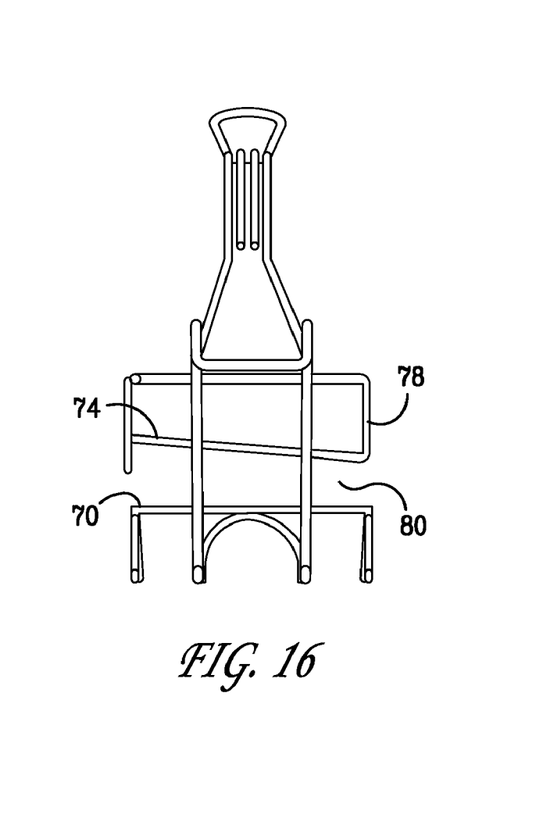
FIG. 16 is an end view of the rack.
Figures 17, 18:
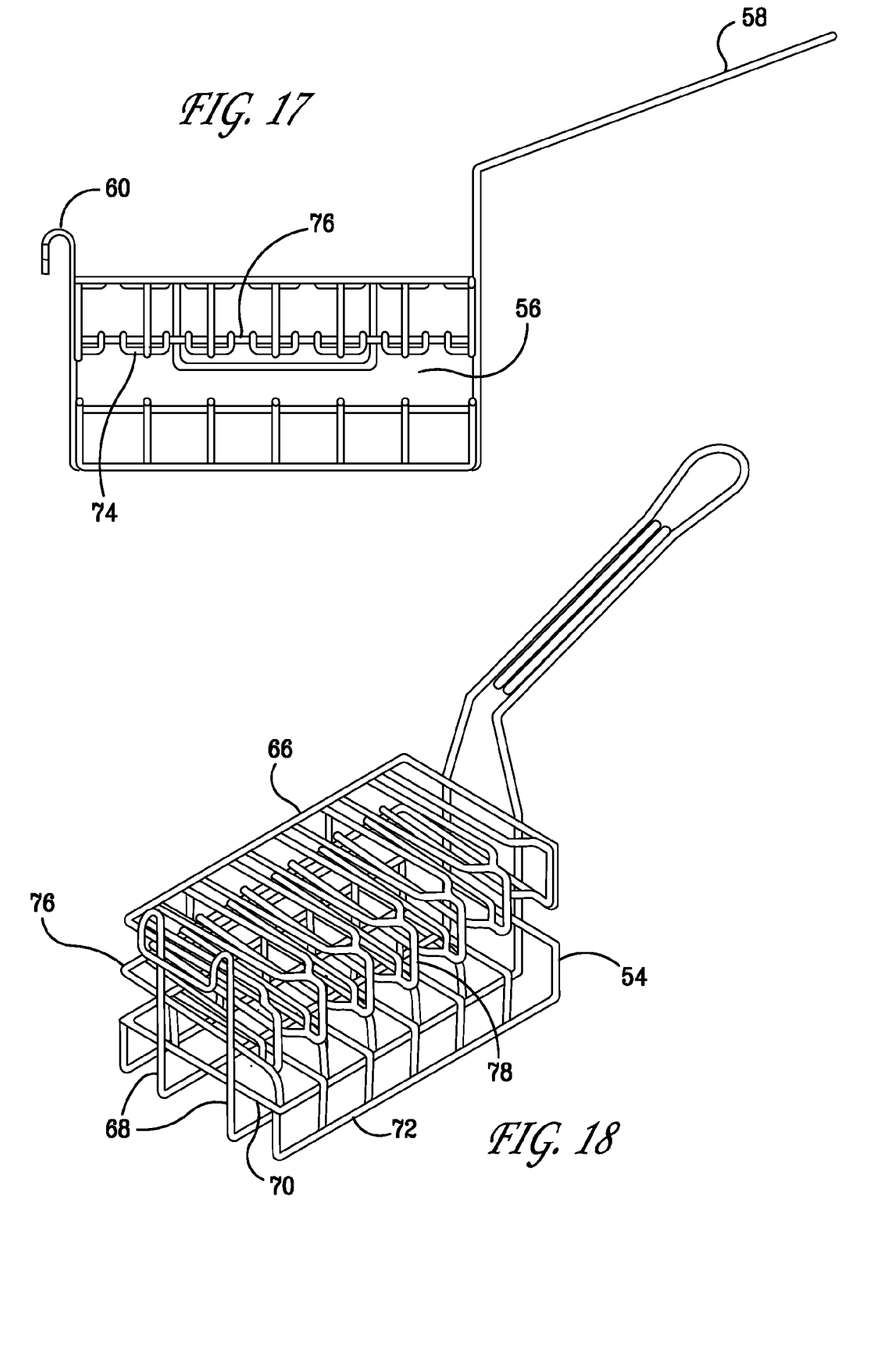
FIG. 17 is a side view of the rack.
FIG. 18 is a perspective view of the rack.

Food item 10 is inserted into pouch 2 prior to pouch 2 immersion. For ease of placement, optionally, food slide 28 is utilized, shown in FIGS. 13 and 14. Food slide 28 is dimensioned such that it can be inserted into pouch open top 30. Once inserted to contact the bottom of pouch 2, food item 10 is slid down food slide 28 and food slide 28 is thereafter withdrawn. In this manner food item 10 remains properly positioned at the bottom of pouch 2.

Turning to FIGS. 1 and 15 through 18, prior to submersion, pouch 2 is inserted into and supported by rack 40. Rack 40 may hold a single pouch 2 or a plurality of pouches 2, thereby permitting simultaneous cooking of multiple food items 10. The number of pouches 2 is limited only by rack 40 design. Rack 40 is utilized to insure effective positioning of pouch 2 in hot cooking oil 12. Rack 40 supports pouch 2 in a substantially vertical position, thereby maintaining pouch open top 30 above the surface of hot cooking oil 12.

Rack 40 and pouch 2 are lowered into hot liquid, for example, hot cooking oil 12 contained by a deep fryer (not shown) to a sufficient depth such that pouch 2 and, hence, food item 10 are below top surface 42 of hot cooking oil 12 to a depth sufficient to allow effective heat transfer from hot cooking oil 12 through pouch 2 to food item 10 to fully cook food item 10. Hot cooking oil 12 substantially instantaneously raises the temperature of pouch 2 to an effective frying temperature. Pouch top opening 30 serves as a vent and remains above hot cooking oil top surface 42 an effective distance to prevent hot cooking oil 12 from coming into direct contact with food item 10.

Due to the excellent heat transfer characteristics inherent in film 18, heat is substantially instantaneously transferred from hot cooking oil 12 through pouch 2 to effectively fry food item 10 held within. Cooking oil 12 hydrostatic pressure collapses pouch 2 placing it in intimate contact with substantially all surfaces of food item 10, causing food item 10 to effectively immediately start frying. Steam and hot vapors (not shown), which may be omitted from food item 10 during the frying process, escape through pouch top opening 30, which serves as a vent.

Rack 40 is fabricated from, for example, wire frame 54. Pouch support section 56 is attached at a first end to handle 58 and at a second end to hanger 60. Hanger 60 rises superior to support section 56 such that when engaged with a deep fryer hanger rail (not shown), pouch 2 is submerged in hot cooking oil 12 and handle 58 is not. Hanger 60 is also used to support rack 40 when rack 40 is suspended above hot cooking oil 12 to permit drainage of hot cooking oil 12.

Pouch support section 56 comprises superior longitudinal members 66 separated by superior cross members 64. Superior cross members 64 support handle 58 and hanger 60. Vertical member 68 is attached to superior cross member 64 and lower cross member 70. At least one lower cross member 70 separates inferior longitudinal members 72. Inferior longitudinal members 72 are dimensioned such that pouch 2 rests upon and is supported by at least one inferior longitudinal member 72.

Slanted cross member 74 is attached to rear vertical member 76 superior to its attachment to front vertical member 78. Rear vertical member 76 is positioned and dimensioned to restrict pouch 2 from exiting the rear of basket 40. Pouch 2 is inserted into basket 40 through basket open side 80. In this manner, as pouch 2 floats upon immersion in cooking oil 12, slanted cross member 74 causes pouch 2 to float towards the rear of basked 40, where it is prevented from exiting basket 40 by rear vertical member 76. Slanted cross member 74 is positioned and dimensioned to prevent pouch 2 from exiting basket 2 through its top.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A system for barrier submersion cooking comprising:
a thin walled plastic cooking pouch for receiving a food item effectively dimensioned such that when lowered into a hot liquid cooking medium a vent remains above a top surface of the liquid cooking medium; and
a rack for lowering the pouch into the liquid cooking medium to an effective depth such that the food item received by the pouch is below the top surface of the liquid cooking medium and the vent is above the top surface of the liquid cooking medium; wherein the rack comprises a body having a top, an open front side for receiving a pouch; a bottom support member for supporting the pouch, and a rear side, the body dimensioned such that the pouch can only enter and exit through the open front side, the body dimensioned such that a floating pouch is directed away from the open front side, the body effectively liquid permeable to allow a liquid to freely flow within the body;
a handle attached to the body for carrying the rack;
a hanger attached to the body positioned for suspending said rack when hung on a rack hanger; and,
wherein the pouch is formed of liquid impermeable food grade pliable polymer film having a melt temperature above that of a temperature used in conventional hot oil frying processes, a heat transfer rate of an effective value to substantially instantaneously transfer heat from the liquid cooking medium to create an effective frying temperature of about 350 degrees to about 400 degrees F. upon the food item, such that the pouch will collapse on itself when exposed to hydrostatic pressures when submerged within the liquid cooking medium.

2. The system of claim 1 further comprising a slanted cross member attached within the body effectively dimensioned and located to direct a floating pouch away from the open front side.

3. The system of claim 2 wherein the slanted cross member is attached such that a rear end is superior to a front end.

4. A system for barrier submersion cooking comprising:
a thin walled plastic cooking pouch for receiving a food item effectively dimensioned such that when lowered into a hot liquid cooking medium a vent remains above a top surface of the liquid cooking medium;
a rack for lowering the pouch into the liquid cooking medium to an effective depth such that the food item received by the pouch is below the top surface of the liquid cooking medium and the vent is above the top surface of the liquid cooking medium, wherein the pouch is formed of mylar and the rack comprises a body having a top, an open front side for receiving a pouch, a bottom support member for supporting the pouch, and a rear side, the body dimensioned such that the pouch can only enter and exit through the open front side, the body dimensioned such that a floating pouch is directed away from the open front side, the body effectively liquid permeable to allow a liquid to freely flow within the body;
a handle attached to the body for carrying the rack; and
a hanger attached to the body positioned for suspending the rack when hung on a rack hanger.

5. The system of claim 4 further comprising a slanted cross member attached within the body effectively dimensioned and located to direct a floating pouch away from the open front side.

6. The system of claim 5 wherein the slanted cross member is attached such that a rear end is superior to a front end.

* * * * *